(12) United States Patent
Won

(10) Patent No.: US 7,706,848 B2
(45) Date of Patent: Apr. 27, 2010

(54) JOG DIAL AND MOBILE TERMINAL INCORPORATING JOG DIAL

(75) Inventor: Jong-Moon Won, Seoul (KR)

(73) Assignee: LG Electronics Inc., Seoul (KR)

( * ) Notice: Subject to any disclaimer, the term of this patent is extended or adjusted under 35 U.S.C. 154(b) by 630 days.

(21) Appl. No.: 11/620,856

(22) Filed: Jan. 8, 2007

(65) Prior Publication Data

US 2007/0163814 A1    Jul. 19, 2007

(30) Foreign Application Priority Data

Jan. 13, 2006   (KR) .................... 10-2006-0004130

(51) Int. Cl.
*H04B 1/38* (2006.01)
*H04M 1/00* (2006.01)

(52) U.S. Cl. ............... 455/575.1; 455/90.3; 455/575.4

(58) Field of Classification Search ............... 455/90.3, 455/347–349, 564–566, 575.1, 575.3, 575.43, 455/575.4
See application file for complete search history.

(56) References Cited

U.S. PATENT DOCUMENTS

| | | | | |
|---|---|---|---|---|
| 6,657,855 | B2 * | 12/2003 | Misawa et al. | 361/679.09 |
| 7,115,807 | B2 * | 10/2006 | Yamada et al. | 84/602 |
| 2005/0037814 | A1 * | 2/2005 | Yasui et al. | 455/566 |
| 2005/0183040 | A1 * | 8/2005 | Kondo et al. | 715/841 |

* cited by examiner

*Primary Examiner*—Simon D Nguyen
(74) *Attorney, Agent, or Firm*—Lee, Hong, Degerman, Kang & Waimey

(57) ABSTRACT

A jog dial and a mobile terminal incorporating the jug dial are provided. The rotation direction and rotation speed of the jog dial are detected at the same time. The structure of the jog dial is simplified and the number of components are reduced, thereby reducing manufacturing cost and satisfying various functions of the mobile terminal.

24 Claims, 4 Drawing Sheets

JOG DIAL AND MOBILE TERMINAL INCORPORATING JOG DIAL

CROSS-REFERENCE TO RELATED APPLICATIONS

Pursuant to 35 U.S.C. §119(a), this application claims the benefit of earlier filing date and right of priority to Korean Application No. 10-2006-0004130, filed Jan. 13, 2006, the contents of which is hereby incorporated by reference herein in its entirety.

FIELD OF THE INVENTION

The present invention is directed to a jog dial and a mobile terminal incorporating the jog dial, and more particularly, to a mobile terminal having a jog dial that is capable of detecting a rotation direction and a rotation speed of the jog dial at the same time.

DESCRIPTION OF THE RELATED ART

In general, a jog dial is increasingly being used in mobile terminals as functions are added to mobile terminals in order to allow convenient manipulation of various functions. In a related art mobile terminal, a user rotates a jog dial to move a pointer, so that the user can quickly find desired information.

When the jog dial is rotated, a rotation direction of the jog dial is detected and the pointer is moved according to the rotation direction of the jog dial in order to find desired information. However, in the related art, only the rotation direction of the jog dial of the mobile terminal is detected and this may be insufficient for the various functions of the terminal.

SUMMARY OF THE INVENTION

An object of the present invention is to provide a mobile terminal having a jog dial capable of reducing manufacturing cost by simplifying the structure of the jog dial and reducing the number of components. Another object of the present invention is implementing various functions by detecting not only a rotation direction of the jog dial, but also a rotation speed of the jog dial.

In one aspect of the present invention, a jog dial is provided. The jog dial includes a disc rotatably mounted to a body, a plurality of reflecting plates arranged about an outer circumferential surface of the disc and an optical sensor installed on an inner wall of the body and adapted to sequentially recognize light reflected by the reflecting plates when the disc is rotated and detect a rotation direction and a rotation speed of the disc.

It is contemplated that the disc includes a round plate shape with a central portion rotatably supported by a hinge shaft mounted to the body. It is further contemplated that the plurality of reflecting plates are arranged such that one or more reflecting plate units are formed at regular intervals about the outer circumferential surface of the disc, each of the one or more reflecting plate units including a first reflecting plate and a second reflecting plate arranged horizontally with respect to each other, a third plate arranged vertically with respect to the second reflecting plate and a fourth reflecting plate arranged horizontally with respect to the third reflecting plate.

It is contemplated that the optical sensor includes a first optical sensor adapted to detect light reflected from the first reflecting plate and the second reflecting plate and a second optical sensor adapted to detect light reflected from the third reflecting plate and the fourth reflecting plate. It is further contemplated that the first optical sensor includes a first light emitting device installed on the inner wall of the body and adapted to emit light toward the first reflecting plate and the second reflecting plate and a first light receiving device adapted to receive light reflected by the first reflecting plate and the second reflecting plate.

It is contemplated that the jog dial further includes a first partition wall installed between the first light emitting device and the first light receiving device and adapted to prevent the first light receiving device from receiving light other than light reflected by the first and second reflecting plates. It is further contemplated that the second optical sensor includes a second light emitting device installed on the inner wall of the body and adapted to emit light toward the third reflecting plate and the fourth reflecting plate and a second light receiving device adapted to receive light reflected by the third reflecting plate and the fourth reflecting plate.

It is contemplated that the jog dial further includes a second partition wall installed between the second light emitting device and the second light receiving device and adapted to prevent the second light receiving device light from receiving light other than light reflected by the third and fourth reflecting plates. It is further contemplated that the optical sensor is adapted to detect the rotation direction of the disc based on signal values read by the first light receiving device and second light receiving device.

It is contemplated that the signal values read by the first light receiving device and second light receiving device are a repeating pattern including (1, 0), (1, 1) and (0, 1) when the disc is rotated clockwise and the signal values read by the first light receiving device and second light receiving device are a repeating pattern including (0, 1), (1, 1) and (1, 0) when the disc is rotated counterclockwise. It is further contemplated that the optical sensor is adapted to detect the rotation speed of the disc based on the number of signals per unit time read by the first light receiving device and second light receiving device.

It is contemplated that the optical sensor includes a laser diode. It is further contemplated that the jog dial is installed in a mobile terminal.

In another aspect of the present invention, a mobile terminal is provided. The mobile terminal includes a terminal body, an optical sensor installed on the terminal body, the optical sensor including at least one light emitting device and at least one light receiving device and a jog dial including a plurality of reflecting plates arranged about a circumferential surface of a disc, wherein the optical sensor is adapted to detect a rotation direction and a rotation speed of the disc.

It is contemplated that the optical sensor is further adapted to sequentially recognize light reflected by the reflecting plates when the disc is rotated. It is further contemplated that the disc includes a round plate shape with a central portion rotatably supported by a hinge shaft mounted to the terminal body.

It is contemplated that the plurality of reflecting plates are arranged such that one or more reflecting plate units are formed at regular intervals about an outer circumferential surface of the disc, each of the one or more reflecting plate units including a first reflecting plate and a second reflecting plate arranged horizontally with respect to each other, a third plate arranged vertically with respect to the second reflecting plate and a fourth reflecting plate arranged horizontally with respect to the third reflecting plate. It is further contemplated that the optical sensor includes a first optical sensor adapted to detect light reflected from the first reflecting plate and the second reflecting plate and a second optical sensor adapted to detect light reflected from the third reflecting plate and the fourth reflecting plate.

It is contemplated that the first optical sensor includes a first light emitting device installed on the inner wall of the terminal body and adapted to emit light toward the first reflecting plate and the second reflecting plate and a first light receiving device adapted to receive light reflected by the first reflecting plate and the second reflecting plate. It is further contemplated that the first optical sensor further includes a first partition wall installed between the first light emitting device and the first light receiving device and adapted to prevent the first light receiving device from receiving light other than light reflected by the first and second reflecting plates.

It is contemplated that the second optical sensor includes a second light emitting device installed on the inner wall of the terminal body and adapted to emit light toward the third reflecting plate and the fourth reflecting plate and a second light receiving device adapted to receive light reflected by the third reflecting plate and the fourth reflecting plate. It is further contemplated that the second optical sensor further includes a second partition wall installed between the second light emitting device and the second light receiving device and adapted to prevent the second light receiving device light from receiving light other than light reflected by the third and fourth reflecting plates.

It is contemplated that the optical sensor is further adapted to detect the rotation direction of the disc based on signal values read by the first light receiving device and second light receiving device. It is further contemplated that the signal values read by the first light receiving device and second light receiving device are a repeating pattern including (1, 0), (1, 1) and (0, 1) when the disc is rotated clockwise and the signal values read by the first light receiving device and second light receiving device are a repeating pattern including (0, 1), (1, 1) and (1, 1) when the disc is rotated counterclockwise.

It is contemplated that the optical sensor is further adapted to detect the rotation speed of the disc based on the number of signals per unit time read by the first light receiving device and second light receiving device. It is further contemplated that the at least one light emitting device includes a laser diode.

Additional features and advantages of the invention will be set forth in the description that follows, and in part will be apparent from the description, or may be learned by practice of the invention. It is to be understood that both the foregoing general description and the following detailed description of the present invention are exemplary and explanatory and are intended to provide further explanation of the invention as claimed.

These and other embodiments will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
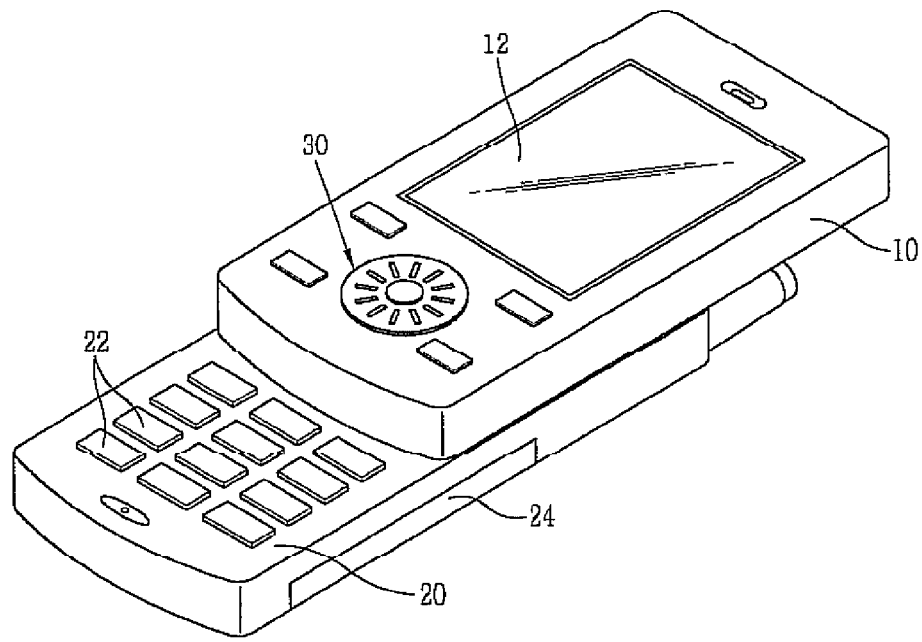
FIG. 1 is a perspective view of a mobile terminal according to one embodiment of the present invention.
Figure 2:
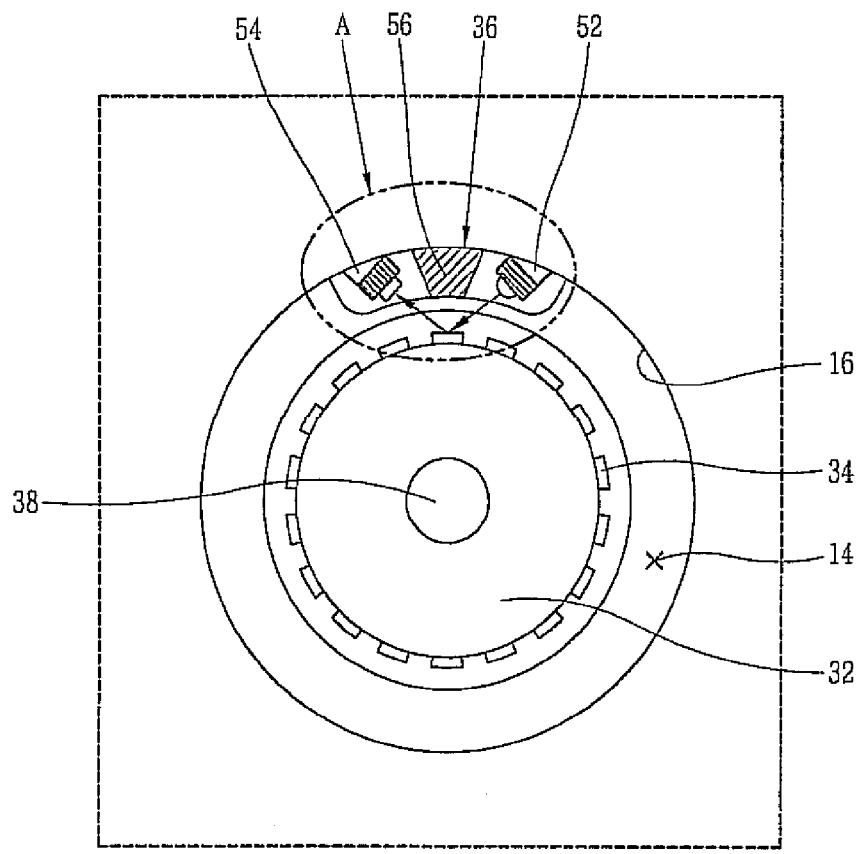
FIG. 2 is a front view of a jog dial according to the present invention.
Figure 3:
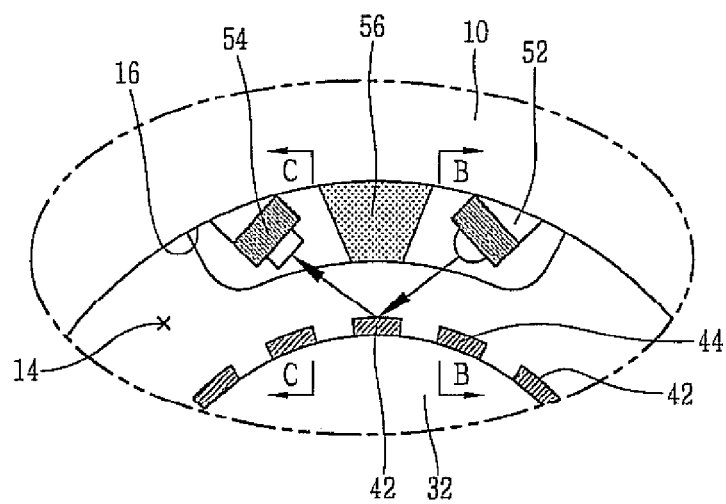
FIG. 3 is an enlarged view of portion "A" of FIG. 2.

Reference will now be made in detail to the preferred embodiments of the present invention, examples of which are illustrated in the accompanying drawings. FIG. 1 is a perspective view of a mobile terminal according to one embodiment of the present invention. FIG. 2 is a front view of a jog dial according to the present invention. FIG. 3 is an enlarged view of a portion of FIG. 2.

A mobile terminal according to the present invention includes a first body 10 having a display unit 12 for displaying information, a second body 20 attached to the first body and having a key pad 22 mounted at its front surface through which information is input and a battery 24 mounted at a rear surface of the second body. The second body 20 is adapted to be opened and closed with respect to the first body 10. A jog dial 30 is installed on at least one of the first body 10 and the second body 20.

Although the present invention is described with reference to a slide-type mobile terminal, the present invention may be applied to any type of mobile terminal, such as a bar-type, a folder-type and a swing-type mobile terminal.

As illustrated in FIGS. 1 to 3, the jog dial 30 includes a disc 32 rotatably supported by a receiving part 14 formed at the first body 10, a reflector 34 having a plurality of reflecting plates along an outer circumferential surface of the disc 32 at predetermined intervals, and an optical sensor 36 installed at one side of the receiving part 14 for receiving light reflected by the reflector in order to detect a rotation direction and a rotation speed of the disc. The disc 32 is formed in the form of a round plate.

A hinge shaft 38 formed at the receiving part 14 rotatably supports a central portion of the disc 32. An upper surface of the disc 32 is exposed to the outside of the receiving part 14 so that a user can rotate the disc 32 with his or her finger.

Figure 4:
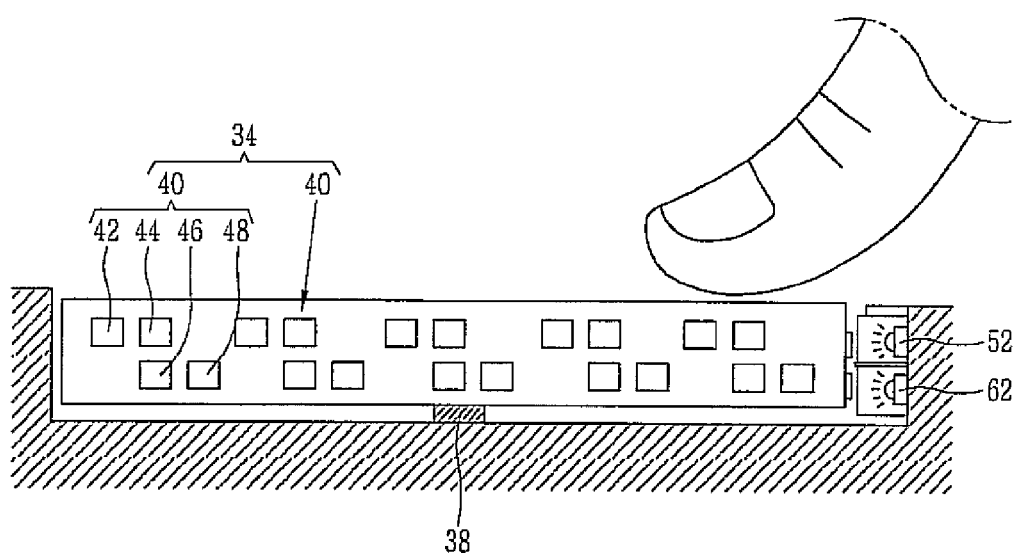
FIG. 4 is a side view of the jog dial according to the present invention.

As illustrated in FIG. 4, the reflector 34 includes one or more reflecting plate units 40, each having four reflecting plates. The reflecting plate units 40 are arranged on an outer circumferential surface of the disc 32 at regular intervals. The reflecting plate units 40 may be formed of any material that can reflect light, such as a mirror.

Figure 5:
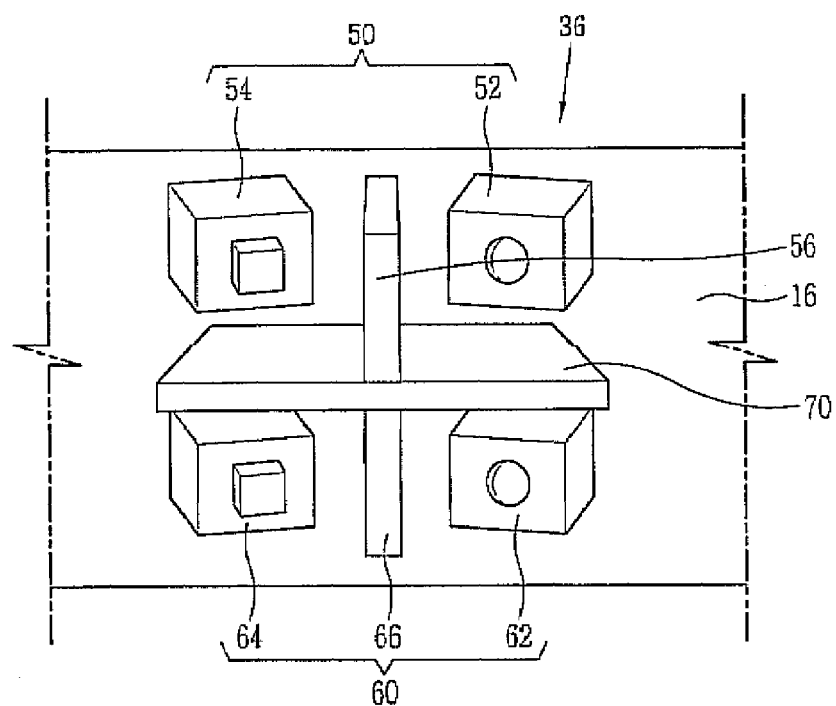
FIG. 5 is a side view of an optical sensor of the jog dial according to the present invention.
Figure 6:
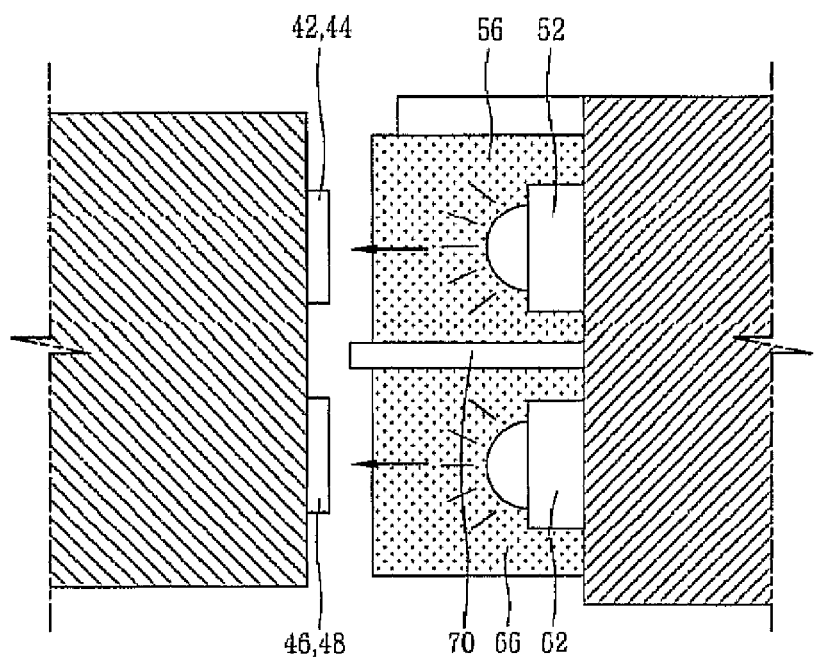
FIG. 6 is a cross-sectional view taken along line B-B of FIG. 3.
Figure 7:
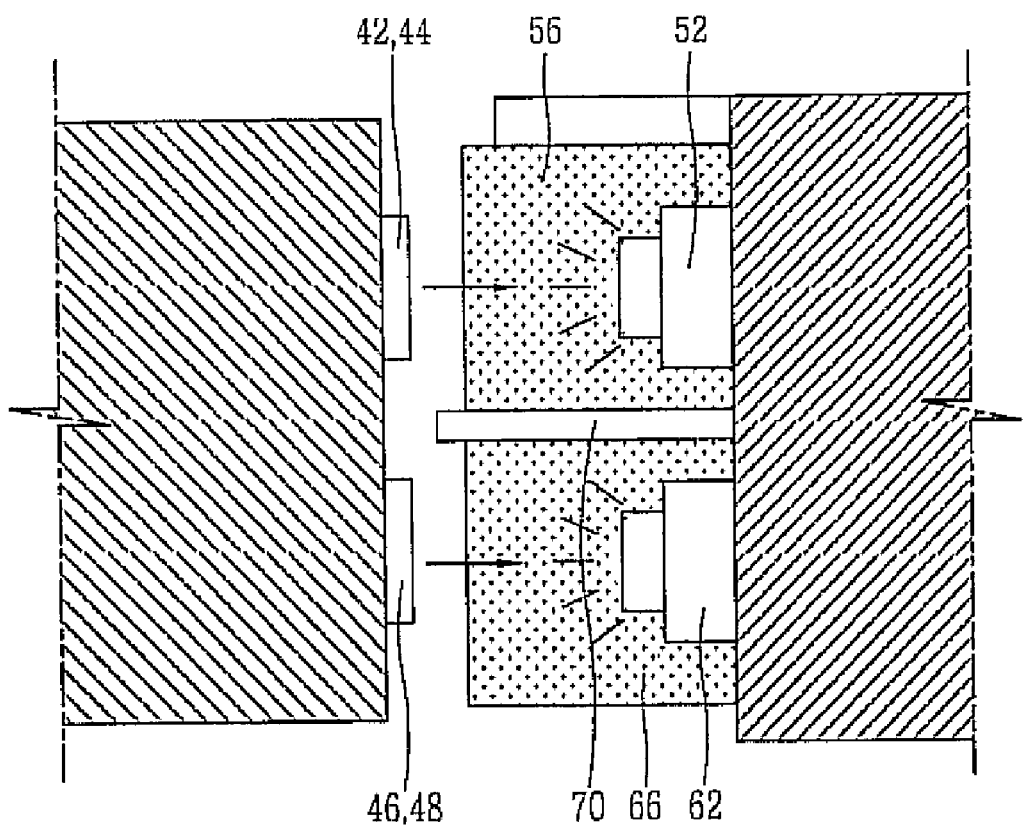
FIG. 7 is a cross-sectional view taken along line C-C of FIG. 3.

Each reflecting plate unit 40 includes a first reflecting plate 42 and a second reflecting plate 44 arranged horizontally at a predetermined interval, a third reflecting plate 46 arranged vertically under the second reflecting plate 44 at a predetermined interval, and a fourth reflecting plate 48 arranged horizontally with respect to the third reflecting plate 46 at a predetermined interval. As illustrated in FIGS. 5 to 7, the optical sensor 36 includes a first optical sensor 50 that detects light reflected from the first reflecting plate 42 and second reflecting plate 44 and a second optical sensor 60 that detects light reflected from the third reflecting plate 46 and fourth reflecting plate 48.

The first optical sensor 50 includes a first light emitting device 52 and a first light receiving device 54. The first light emitting device 52 is installed on an inner wall 16 of the receiving part 14 and emits light to the first and second reflecting plates 42 and 44. The first light receiving device 54 is installed on the inner wall of the receiving part horizontally with respect to the first light emitting device and at a predetermined interval. The first light receiving device receives light reflected from the first reflecting plate 42 and second reflecting plate 44.

The first light emitting device 52 and the first light receiving device 54 are inclined with respect to each other at a predetermined angle. The light emitted from the first light emitting device 52 is reflected by the first and second reflecting plates 42 and 44 and the reflected light is received by the first light receiving device 54.

Preferably, a laser diode that emits a laser beam is used as the first light emitting device 52. A partition wall 56 is installed between the first light emitting device 52 and the first light receiving device 54 to prevent light other than the light reflected by the first and second reflecting plates 42 and 44 from being received by the first light receiving device.

The second optical sensor 60 includes a second light emitting device 62 and a second light receiving device 64. The second light emitting device 62 is disposed vertically under the first light emitting device 52 and emits light to the third reflecting plate 46 and fourth reflecting plate 48. The second light receiving device 64 is disposed vertically under the first light receiving device 54 and receives light reflected from the third reflecting plate 46 and fourth reflecting plate 48.

The second light emitting device 62 and the second light receiving device 64 are inclined with respect to each other at a predetermined angle. The third and the fourth reflecting plates 46 and 48 reflect the light emitted from the second light emitting device 62 and the reflected light is received by the second light receiving device 64.

Preferably, a laser diode is used as the second light emitting device 62. A partition wall 66 is installed between the second light emitting device 62 and the second light receiving device 64 to prevent light other than the light reflected by the third and fourth reflecting plates 46 and 48 from being received by the second light receiving device.

A blocking wall 70 is installed between the first optical sensor 50 and second optical sensor 60 to prevent light emitted from the first optical sensor 50 from being introduced to the second optical sensor. The blocking wall 70 also prevents light emitted from the second optical sensor 60 from being introduced to the first optical sensor 50.

When the disc 32 rotates clockwise, light emitted by the first light emitting device 52 is reflected by the first reflecting plate 42 and is then received by the first light receiving device 54. However, the second light receiving device 64 does not receive light emitted by the second light emitting device 62 because no reflecting plate is present. Therefore, a signal read by the first light receiving device 54 and the second light receiving device 64 is (1, 0).

As the disc 32 rotates further, light reflected by the second reflecting plate 44 and the third reflecting plate 46, disposed vertically with respect to each other, is received by the first light receiving device 54 and second light receiving device 64. Therefore, a signal read by the first light receiving device 54 and second light receiving device 64 is (1, 1). As the disc 32 rotates further, the first light receiving device 54 receives no light and the second light receiving device 64 receives light reflected by the fourth reflecting plate 48. Therefore, a signal read by the first light receiving device 54 and the second light receiving device 64 is (0, 1).

As previously described, when the disc 32 rotates clockwise, signals read by the first light receiving device 54 and the second light receiving device 64 are a repeating pattern of (1, 0), (1, 1) and (0, 1). Therefore, a controller can recognize that the disc 32 rotates clockwise.

On the other hand, when the disc 32 rotates counterclockwise, signals read by the first light receiving device 54 and the second light receiving device 64 are a repeating a pattern of (0, 1), (1, 1) and (1, 0), which is opposite to the patterns received when the disc rotates clockwise. Therefore, the controller can recognize that the disc 32 rotates counterclockwise.

The controller can also detect a rotation speed of the disc 32 based on the number of signals read per unit time. In this way, the controller can detect both a rotation direction and a rotation speed.

As the present invention may be embodied in several forms without departing from the spirit or essential characteristics thereof it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A jog dial, comprising:
   a disc rotatably mounted to a body;
   a plurality of reflecting plates arranged at predetermined intervals about an outer circumferential surface of the disc and adapted to reflect light; and
   an optical sensor installed on an inner wall of the body and adapted to sequentially recognize the light reflected by the plurality of reflecting plates when the disc is rotated and detect a rotation direction and a rotation speed of the disc,
   wherein the plurality of reflecting plates comprise a plurality of reflecting plate units that are formed at regular intervals about the outer circumferential surface of the disc, each of the plurality of reflecting plate units including a first reflecting plate and a second reflecting plate arranged horizontally with respect to each other, a third reflecting plate arranged vertically with respect to the second reflecting plate and a fourth reflecting plate arranged horizontally with respect to the third reflecting plate.

2. The jog dial of claim 1, wherein the disc comprises a round plate shape with a central portion rotatably supported by a hinge shaft mounted to the body.

3. The jog dial of claim 1, wherein the optical sensor comprises:

a first optical sensor adapted to detect light reflected from the first reflecting plate and the second reflecting plate; and a second optical sensor adapted to detect light reflected from the third reflecting plate and the fourth reflecting plate.

4. The jog dial of claim 3, wherein the first optical sensor comprises:

a first light emitting device installed on the inner wall of the body and adapted to emit light toward the first reflecting plate and the second reflecting plate; and a first light receiving device adapted to receive the light reflected by the first reflecting plate and the second reflecting plate.

5. The jog dial of claim 4, further comprising a first partition wall installed between the first light emitting device and the first light receiving device and adapted to prevent the first light receiving device from receiving light other than the light reflected by the first and second reflecting plates.

6. The jog dial of claim 5, wherein the second optical sensor comprises:

a second light emitting device installed on the inner wall of the body and adapted to emit light toward the third reflecting plate and the fourth reflecting plate; and a second light receiving device adapted to receive the light reflected by the third reflecting plate and the fourth reflecting plate.

7. The jog dial of claim 6, further comprising a second partition wall installed between the second light emitting device and the second light receiving device and adapted to prevent the second light receiving device from receiving light other than the light reflected by the third and fourth reflecting plates.

8. The jog dial of claim 6, wherein the optical sensor is adapted to detect the rotation direction of the disc based on signal values read by the first light receiving device and the second light receiving device.

9. The jog dial of claim 8, wherein the signal values read by the first light receiving device and the second light receiving device are a repeating pattern comprising (1, 0), (1, 1) and (0, 1) when the disc is rotated clockwise and the signal values read by the first light receiving device and the second light receiving device are a repeating pattern comprising (0, 1), (1, 1) and (1, 0) when the disc is rotated counterclockwise.

10. The jog dial of claim 6, wherein the optical sensor is further adapted to detect the rotation speed of the disc based on the number of signals per unit time read by the first light receiving device and the second light receiving device.

11. The jog dial of claim 1, wherein the optical sensor comprises a laser diode.

12. The jog dial of claim 1, wherein the jog dial is installed in a mobile terminal.

13. A mobile terminal, comprising:

a terminal body;

an optical sensor installed in the terminal body, the optical sensor comprising at least one light emitting device and at least one light receiving device; and a jog dial comprising a plurality of reflecting plates arranged at predetermined intervals about a circumferential surface of a disc and adapted to reflect light, wherein the optical sensor is adapted to detect a rotation direction and a rotation speed of the disc, wherein the plurality of reflecting plates comprise a plurality of reflecting plate units that are formed at regular intervals about the outer circumferential surface of the disc, each of the plurality of reflecting plate units including a first reflecting plate and a second reflecting plate arranged horizontally with respect to each other, a third reflecting plate arrange vertically with respect to the second reflecting plate and a four reflecting plate arranged horizontally with respect to the third reflecting plate.

14. The mobile terminal of claim 13, wherein the optical sensor is further adapted to sequentially recognize the light reflected by the plurality of reflecting plates when the disc is rotated.

15. The mobile terminal of claim 13, wherein the disc comprises a round plate shape with a central portion rotatably supported by a hinge shaft mounted to the terminal body.

16. The mobile terminal of claim 13, wherein the optical sensor comprises:

a first optical sensor adapted to detect light reflected from the first reflecting plate and the second reflecting plate; and a second optical sensor adapted to detect light reflected from the third reflecting plate and the fourth reflecting plate.

17. The mobile terminal of claim 16, wherein the first optical sensor comprises:

a first light emitting device installed on the inner wall of the terminal body and adapted to emit light toward the first reflecting plate and the second reflecting plate; and a first light receiving device adapted to receive the light reflected by the first reflecting plate and the second reflecting plate.

18. The mobile terminal of claim 17, wherein the first optical sensor further comprises a first partition wall installed between the first light emitting device and the first light receiving device and adapted to prevent the first light receiving device from receiving light other than the light reflected by the first and second reflecting plates.

19. The mobile terminal of claim 17, wherein the second optical sensor comprises:

a second light emitting device installed on the inner wall of the terminal body and adapted to emit light toward the third reflecting plate and the fourth reflecting plate; and a second light receiving device adapted to receive the light reflected by the third reflecting plate and the fourth reflecting plate.

20. The mobile terminal of claim 19, wherein the second optical sensor further comprises a second partition wall installed between the second light emitting device and the second light receiving device and adapted to prevent the second light receiving device light from receiving light other than the light reflected by the third and fourth reflecting plates.

21. The mobile terminal of claim 19, wherein the optical sensor is further adapted to detect the rotation direction of the disc based on signal values read by the first light receiving device and the second light receiving device.

22. The mobile terminal of claim 21, wherein the signal values read by the first light receiving device and the second light receiving device are a repeating pattern comprising (1, 0), (1, 1) and (0,1) when the disc is rotated clockwise and the signal values read by the first light receiving device and the second light receiving device are a repeating pattern comprising (0, 1), (1, 1) and (1, 0) when the disc is rotated counterclockwise.

23. The mobile terminal of claim 19, wherein the optical sensor is further adapted to detect the rotation speed of the disc based on the number of signals per unit time read by the first light receiving device and the second light receiving device.

24. The mobile terminal of claim 13, wherein the at least one light emitting device comprises a laser diode.

* * * * *